June 20, 1967 T. R. DUGGAN 3,325,915
INDEXING ROSARY ASSEMBLAGE
Filed Aug. 18, 1965

INVENTOR.
THOMAS R. DUGGAN
BY
Leonard H. King
ATTORNEY.

United States Patent Office 3,325,915
Patented June 20, 1967

3,325,915
INDEXING ROSARY ASSEMBLAGE
Thomas R. Duggan, Brooklyn, N.Y., assignor of one-half to Alvaro Adams, Rosedale, N.Y.
Filed Aug. 18, 1965, Ser. No. 480,678
2 Claims. (Cl. 35—23)

This invention relates generally to rosaries and more particularly to indexing means therefor to successively expose a single bead at a time.

Rosaries generally are in the form of an endless loop of beads, having flexible connecting means, such as string. Attempts have been made in the past to contain the beads in a small compact housing that may be unobtrusively held in the hand when used in public. However, the mechanisms presently available are quite complex, thus making the cost of the rosary prohibitive. Of even more importance is the fact that means have not heretofore been provided for accommodating all fifty beads of the rosary within a small housing together with means for indexing or exposing a single bead at a time as the prayers are said.

The present invention is comprised of a minimum number of low cost, easily fabricated parts. A two-part housing contains a spring-loaded reel upon which the beads are mounted. One bead at a time emerges from the housing through a shaped aperture that is provided with a spring-biased clamp. Thus only the beads that have already been said are exposed. The particular bead that is being said is disposed proximate the outside surface of the housing while all the remaining beads are contained within the housing. Retraction of the aperture clamp permits all of the beads to be returned to the inside of the housing.

Accordingly, it is an object of the present invention to provide an improved indexing means for rosary beads.

Another object is to provide a low cost housing for rosary beads wherein the exit of the next bead to be said is prevented by means of the resilient indexing feature.

Yet another object is to provide retractable indexing means which defines a passageway for the beads that normally permits the exit of the beads one at a time.

A further object of the present invention is to provide a low cost compact housing for rosary beads including means to expose one bead at a time.

An additional object is to include means for normally urging the rosary beads into the housing.

Still another object is to provide means for housing a full length of rosary beads under spring tension whereby the bead being said is positioned immediately adjacent to the exterior of the housing, wherein the next bead to be said is resiliently clamped within the housing and wherein a slight pulling force is required to expose the next bead.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

Figure 1:
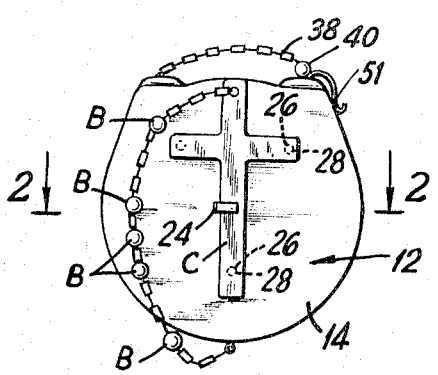
FIG. 1 is a plan view of the present invention.
Figure 2:
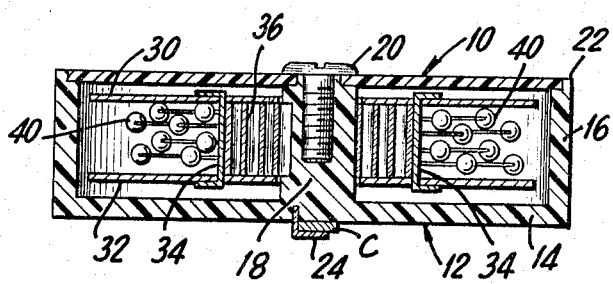
FIG. 2 is a transverse sectional view taken along line 2—2 of FIG. 1.

Referring now to FIG. 1 and FIG. 2 of the drawing, the present invention is provided with a housing 10 comprised of a cover member 10 and a base member 12. The base member is cup-shaped, having a bottom wall 14 and an upstanding side wall 16. A central threaded hub 18 is formed integrally with the base member so that the cover member 10 may be secured thereto by means of a screw 20. A lip 22 defining a recess is formed on wall 16 to provide a seat for the cover and to prevent it from turning. While the cover and base members are shown as plastic, it is to be understood that metal members may also be employed.

In the embodiment illustrated a crucifix C is removably attached to bottom wall 14 of the housing base member by means of an L-shaped resilient clip 24. Stationary beads B on a chain or other flexible connection extend between the crucifix and the bottom of the base member. These beads form the beginning of a rosary consisting of the Apostle's Creed in conjunction with the Our Father and Hail Marys. Other means to retain the crucifix, such as magnets, may also be used in place of the aforementioned clip. It should also be noted that with either means for releasably securing the crucifix, it is desirable to provide depressions 26 on surface 14 of the housing. Small pads 28 on the rear surface of the crucifix mate with depressions 26 so that it is positively seated.

Figure 3:
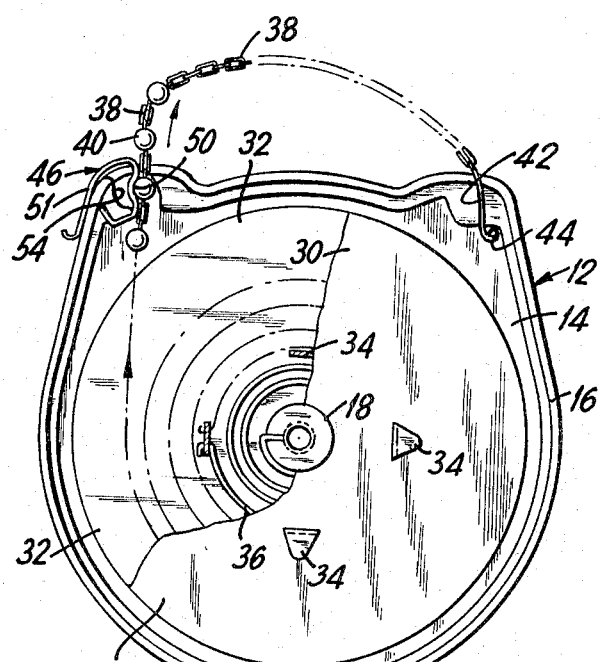
FIG. 3 is an enlarged rear view with the cover removed and a portion of the reel broken away.

As shown in FIG. 2 and FIG. 3, a reel comprised of upper and lower plates 30 and 32, respectively, and having spacing members 34, is rotatably supported by hub 18. A coiled spring 36 has one end embedded in the hub. The other end of the spring is attached to the end of the string or link chain 38 on which rosary beads 40 are secured. Alternatively, the other end of the spring may be attached to the reel with the inner end of chain 38 also secured to the reel. The beads and chain are comprised of five decades of ten beads each. The separation between the decades may be by a larger than normal spacing or by a colored bead. Chain 38 is secured at its opposite end in a notch 42 formed in wall 16 of base member 12. A knot 44 or other enlargement keeps the chain from pulling out when cover member 10 is secured in place.

Figure 4:
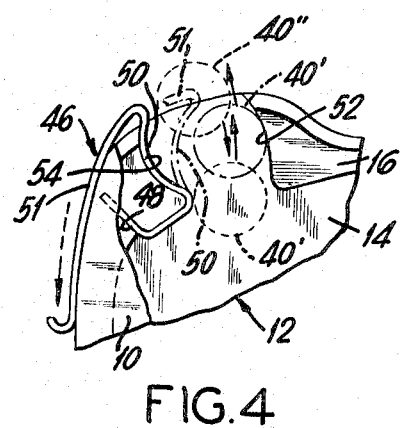
FIG. 4 is an enlarged fragmentary detail view of the resilient bead clamp.

Referring now to the upper left hand corner of FIG. 3 and enlarged FIG. 4, there will be seen novel means for indexing and extracting a single bead at a time from the housing. An aperture is formed in wall 16 and a flat resilient spring clip 46 is secured in notch 48 provided in wall 16. For reasons which will be explained subsequently, an arcuate portion 50 of the clip is disposed within the aperture while a tail portion 51 is disposed on the outside of the housing. By a slight finger pressure the clip may be moved between the two positions shown in FIG. 4.

The spring clip is normally biased as shown in FIG. 3 and in dotted outline in FIG. 4. The bead that is being said is the one closest to the outside of the housing. The next bead is captured between arcuate portion 52 of the housing aperture and arcuate portion 50 of the spring clip. The bend line between the two major portions of the spring clip is interposed between adjacent beads. A slight pull on the chain causes the bead within the aperture to deflect the clip so that a bead may pass. Once the bead has passed the clip again bears against the chain in between two adjacent beads.

With particular reference to FIG. 4, the spring clip is shown fully deflected wherein arcuate portion 50 of the clip is seated against arcuate portion 54 of the wall aperture. This is done by displacing the tail of the clip in the direction of the dotted arrow when all the beads are said. The coil spring 36 will then pull all the beads into the housing. It should be noted that with the clip 46 in its relaxed position (dotted outline in FIG. 4), a bead as represented by 40' can enter the wall aperture but can be taken out only by exerting a pulling force on the chain. However, with the clip fully retracted, the beads as represented by 40″ pass freely through the aperture under the influence of the coil spring.

Figure 5:
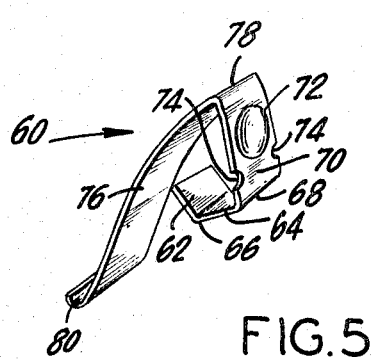
FIG. 5 is a perspective view of an alternative clip.

FIG. 5 illustrates an alternative spring clip 60. A first flat end 62 is dimensioned to fit into a slot provided in the base member. Section 64 is a continuation of the first end having been bent along transverse line 66. Bend line 68 is provided at the other end of section 64. Intermediate section 70, which, in the assembled condition, is disposed in the housing aperture in confronting relationship with arcuate portion 52, is provided with a recess 72 and notches 74 on each edge. Notches 74 provide a narrow cross-section at one point of section 70 and serves as a hinge while the recess provides a positive seat for the bead. End section 76, which starts at bend line 78, is disposed externally of the housing in the assembled condition and is provided with a finger tab 80 whereby the clip may be manually displaced to allow the beads to be retracted under the urging of the coil spring. With the spring clip in the normal or relaxed position, the bend line 78 is positioned closer to arcuate surface 52 than is recess 72. This defines a passageway narrower than the bead so that the coil spring cannot retract the beads. An outward pulling force must be applied for the bead to deflect the spring clip. With the spring clip deflected, either by means of finger tab 80 or the outward pulling force, the combination of the clip intermediate portion and the arcuate portion of the housing aperture define a passageway larger than the bead, so that the bead may freely pass therethrough. Both embodiments of the spring clip provide economical yet effective bead indexing means.

The device described hereinabove and the embodiment shown in the drawing is simple and inexpensive to manufacture. The indexing action is positive so that only one bead is exposed at a time by exerting a slight pulling force on the chain against the normally inward biasing of the coil spring. The bead being said is positioned immediately adjacent the outside surface of the housing while the next bead to be said is resiliently clamped just inside the housing. When all the beads are said they may be quickly retracted by the coil spring merely by depressing the indexing spring. An important feature of this invention is that the indexing means is shaped and located to allow only one bead at a time to be drawn outwardly. This is done by exerting a pulling force in opposition to the force of the coil spring so that the indexing means is deflected to define a larger than bead size aperture. When a single bead has emerged the resilient-indexing means automatically returns to its normal position intermediate two adjacent beads defining, in combination with a portion of the housing wall, a smaller than bead size aperture. This prevents the coil spring from inadvertently pulling in all the beads. The device is inherently trouble free and devoid of jam-up because the beads are withdrawn tangentially from the supply disposed about the reel hub.

The present invention is particularly adapted to accommodate five decades of ten beads each as well as spacers between each decade. However, it is within the scope of the invention to provide only a single decade with ten beads. Because the beads are so easily extracted and retracted as a unit a single decade may be repeated five times.

Having thus disclosed the best embodiment of the invention presently contemplated, it is to be understood that various changes and modifications may be made by those skilled in the art without departing from the spirit of the invention.

What is claimed is:
1. An indexing rosary assemblage comprising:
   (a) a hollow housing defined by a tubular wall having a transverse wall defining an aperture extending radially through the tubular wall and a pair of cover members transverse to the tubular wall;
   (b) a plurality of interconnected beads having spacing means therebetween;
   (c) spring energized reel means, mounted in said housing and connected to said beads, arranged to draw said beads into said housing through the radial aperture; and
   (d) a retractable spring member extending into the radial aperture to capture selected beads, in its unretracted position, against the transverse wall.
2. The device in accordance with claim 1 wherein the portion of the transverse wall opposite the spring member is concave, the concave portion being larger than one of said beads.

References Cited

UNITED STATES PATENTS

| | | | |
|---|---|---|---|
| 154,204 | 8/1874 | Wild | 242—107.2 |
| 450,633 | 4/1891 | Motter | 242—107.2 |
| 1,280,237 | 10/1918 | King. | |
| 1,337,786 | 4/1920 | Mitchell | 188—65.1 |
| 1,413,846 | 4/1922 | Fredak | 242—107.2 |
| 2,781,591 | 2/1957 | Bufalino | 235—123 X |
| 3,156,431 | 11/1964 | Zivi | 242—107 |

FOREIGN PATENTS 479,171  12/1951  Canada.

FRANK J. COHEN, *Primary Examiner.*

W. S. BURDEN, *Assistant Examiner.*